United States Patent [19]
Naoi

[11] Patent Number: 5,871,599
[45] Date of Patent: Feb. 16, 1999

[54] LOW-NOISE PNEUMATIC TIRES WITH SPECIFIED CARCASS LINE

[75] Inventor: Toshikatsu Naoi, Tokyo, Japan

[73] Assignee: Bridgestone Corporation, Tokyo, Japan

[21] Appl. No.: 702,217

[22] Filed: Aug. 23, 1996

[30] Foreign Application Priority Data

Aug. 24, 1995 [JP] Japan .................................. 7-215772

[51] Int. Cl.$^6$ ............................... B60C 3/00; B60C 3/04; B60C 13/00; B60C 13/02
[52] U.S. Cl. ........................ 152/454; 152/523; 152/525; 152/548
[58] Field of Search ..................................... 152/454, 548, 152/555, 523, 525

[56] References Cited

U.S. PATENT DOCUMENTS 4,387,758  6/1983  Matsuda et al. ......................... 152/454

Primary Examiner—Adrienne C. Johnstone
Attorney, Agent, or Firm—Sughrue, Mion, Zinn, Macpeak & Seas, PLLC

[57] ABSTRACT

A pneumatic radial tire for use in truck and bus comprises a carcass reinforcing a sidewall portion and a tread, and a belt comprised of at least two belt layers, wherein when the tire is mounted onto an approved rim and inflated under an internal pressure of 0.5–1.0 kgf/cm$^2$, a carcass line of the carcass at a radial section of the tire comprises a curve having a maximum radius of curvature in a region ranging over 10–50% of a tire sectional height and centering around a position of a maximum carcass width, and the sidewall portion has a maximum thickness in a zone corresponding to the above region.

5 Claims, 3 Drawing Sheets

LOW-NOISE PNEUMATIC TIRES WITH SPECIFIED CARCASS LINE

BACKGROUND OF THE INVENTION

1. Field of the Invention

This invention relates to pneumatic tires, and more particularly to a heavy duty pneumatic radial tire for use in truck and bus use capable of reducing tire noise.

2. Description of Related Art

During the running of the tire, vibrations are applied to the tire due to local variation of rigidity in a tread pattern and unevenness of road surface, which vibrations propagate in air to cause noise. Such tire noise is closely related to resonance frequency of a tread or a sidewall portion, so that it is particularly effective to improve vibration properties of the sidewall portion for reducing noise in this type of the tire.

As regards the vibration properties of the sidewall portion, various countermeasures for reducing tire noise are proposed in tires for passenger cars, while no countermeasure for this type of tire noise is proposed in heavy duty pneumatic radial tires for use in truck and bus.

SUMMARY OF THE INVENTION

It is, therefore, an object of the invention to reduce tire noise by improving the vibration properties of the sidewall portion in a heavy duty pneumatic radial tire.

The inventors have observed vibration behavior applied to the sidewall portion of the tire in detail and found that vibration amplitude is considerably large in a position corresponding to a maximum tire width and in the vicinity thereof. Furthermore, the inventors have made various studies with respect to the shape, thickness and the like of the sidewall portion and found that it is favorable to optimize the shape of the carcass as a skeleton of the tire and the thickness of the sidewall portion for the reduction of tire noise and as a result the invention has been accomplished.

According to the invention, there is the provision of a pneumatic radial tire comprising a carcass toroidally extending between a pair of bead cores through a pair of sidewall portions and a belt superimposed outward about a crown portion of the carcass in a radial direction of the tire and comprised of at least two belt layers, the improvement wherein when the tire is mounted onto an approved rim and inflated under an internal pressure of 0.5–1.0 $kgf/cm^2$, a carcass line of the carcass at a radial section of the tire comprises a curve having a maximum radius of curvature in a region ranging over 10–50% of a sectional height of the tire and centering around a position of a maximum carcass width, and the sidewall portion has a maximum thickness in a zone corresponding to the above region.

The term "carcass line" used herein means a profile line of the carcass at the radial section of the tire. The term "maximum carcass width" used herein means that the distance of the carcass ply in the widthwise direction at the radial section of the tire is a maximum dimension.

In a preferred embodiment of the invention, the carcass line in the region ranging over 10–50% of the sectional height of the tire and centering around the position of maximum carcass width consists of a curve symmetrical with respect to a line segment passing through the position of maximum carcass width and parallel to a rotating axis of the tire, or a thickness of a zone of the sidewall portion corresponding to the region ranging over 10–50% of the sectional height of the tire and centering around the maximum carcass width is not less than 1.4 times a minimum thickness of the sidewall portion.

BRIEF DESCRIPTION OF THE DRAWINGS

The invention will be described with reference to the accompanying drawings, wherein.

DESCRIPTION OF PREFERRED EMBODIMENTS

Figure 1:
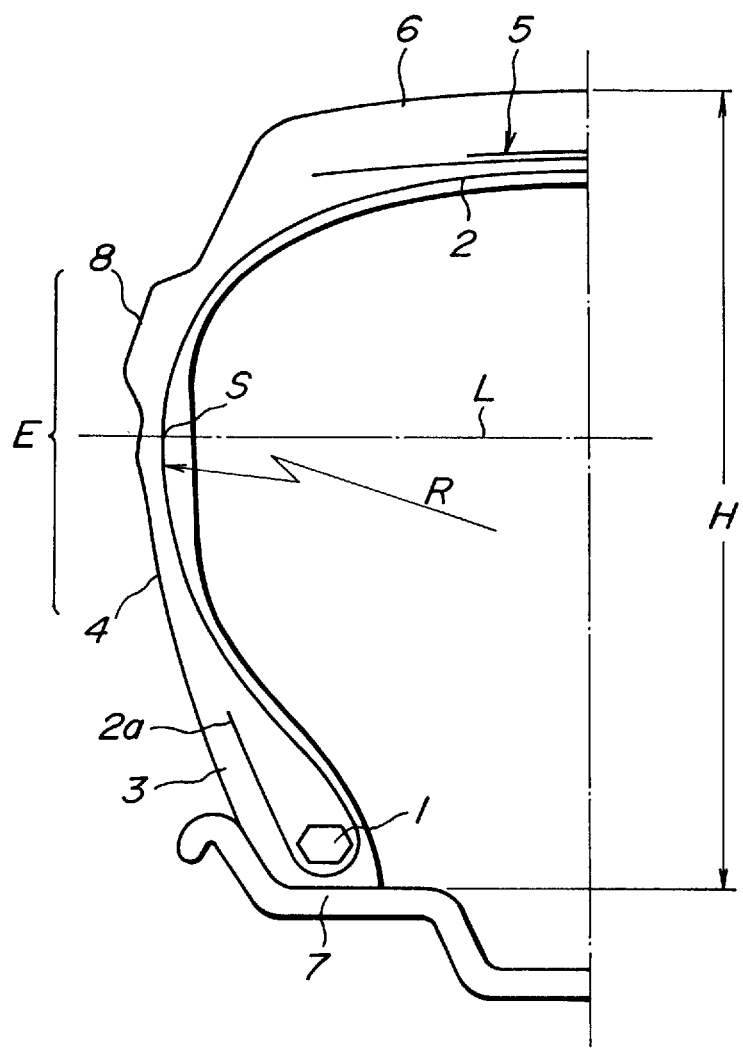
FIG. 1 is a diagrammatically left-half radial section of a first embodiment of the pneumatic radial tire according to the invention.

In FIG. 1 is diagrammatically shown a left-half radial section of the pneumatic radial tire according to the invention at an inflated state under an internal pressure of 1.0 $kgf/cm^2$ after the mounting onto an approved rim. Of course, the right-half section of the tire (not shown) is symmetrical with the left-half section thereof.

Numeral 1 is a bead core, and numeral 2 a carcass comprised of a single carcass ply toroidally extending between the bead cores 1 along an inner wall of the tire and wound around the bead core 1 from inside of the tire toward outside to form a turnup portion 2a extending along a bead portion 3 toward a sidewall portion 4. On a crown portion of the carcass 1 are disposed a belt 5 comprised of at least two belt layers and a tread 6 in a radial direction of the tire in turn. Moreover, numeral 7 is an approved rim.

When the tire having the above basic structure is mounted onto an approved rim and inflated under an internal pressure of 0.5–1.0 $kgf/cm^2$, it is important that a carcass profile line of the carcass 1 at radial section of the tire comprises a curve having a maximum radius of curvature R in a region E ranging over 10–50% of a section height H of the tire (which is defined by ½ of a difference between an outer diameter of the tire and a diameter of the rim) and centering around a position S corresponding to a maximum carcass width. Preferably, such a curve is symmetrical with respect to a line segment L passing through the position S of maximum carcass width and parallel to a rotating axis of the tire because the position of maximum carcass width corresponds to a loop portion in mode of tire vibration and more develops an effect of controlling vibration portion.

That is, a portion of the carcass line corresponding to the region E is constituted with a curve having a maximum radius of curvature R, so that when the tire is inflated under a standard internal pressure, tension per unit area at the region E becomes sufficiently large as compared with the other region and hence vibrations violently produced in the zone of the sidewall portion corresponding to the region E are controlled to reduce the tire noise.

Figure 2:
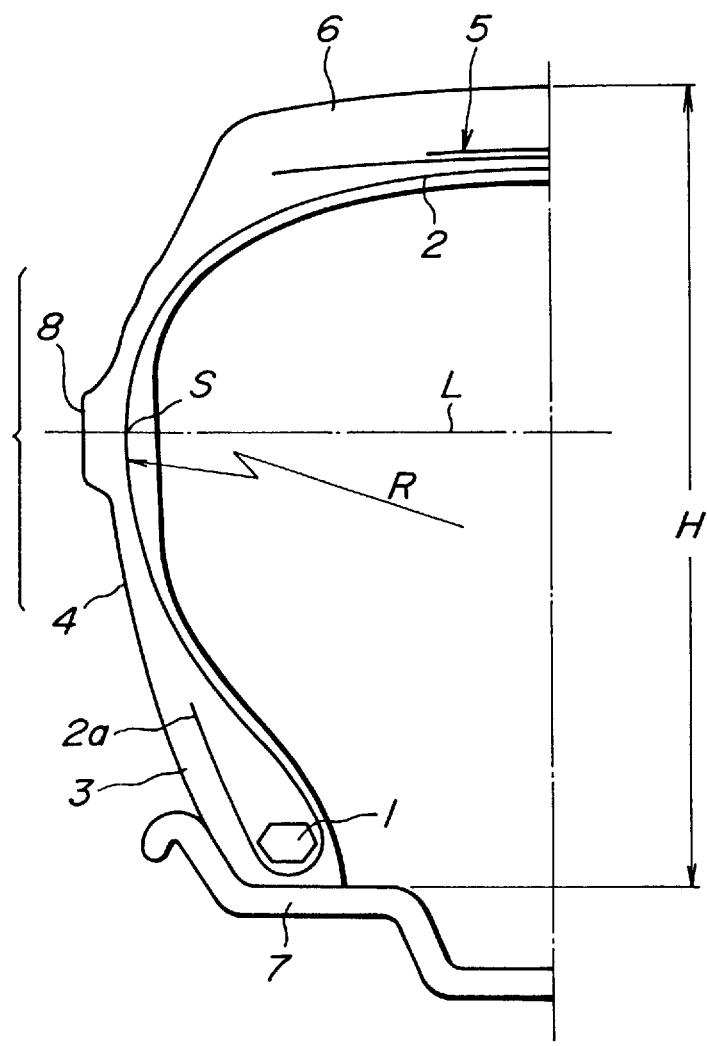
FIG. 2 is a diagrammatically left-half radial section of a second embodiment of the pneumatic radial tire according to the invention.

Furthermore, in the sidewall portion is important to have a greatest thickness at the zone corresponding to the above region E. Concretely, a rubber layer 8 is added to the zone of the sidewall portion corresponding to the region E as shown in FIGS. 1 and 2, whereby a thickening part may be formed in the region E. In this case, the rubber layer 8 may be arranged over a whole of the region E, but it is favorable that at least 20% of the region E is formed by the thickening part.

Thus, when the thickness is maximized at the zone of the sidewall portion corresponding to the region E, rubber mass at this zone increases as compared with the other zone, so that vibrations transmitted from road surface through tread surface can be absorbed at the region E to control the application of vibration to the sidewall portion, which brings about the reduction of tire noise.

In order to further promote the reduction of tire noise by the above action, it is preferable that the thickness of the zone of the sidewall portion corresponding to the region E is not less than 1.4 times a minimum thickness of the sidewall portion.

The following examples are given in illustration of the invention and are not intended as limitations thereof.

Various pneumatic radial tires for truck and bus having a tire size of 11R22.5 and a basic structure as shown in FIGS. 1 and 2 are manufactured according to a specification as shown in Table 1, respectively. Each of these tires is mounted onto an approved rim and inflated under a standard internal pressure, which is run on a drum testing machine at a speed of 50 km/h under a standard load, during which sound pressure of noise from the tire is measured by means of a microphone located on a distance of 1.0 m apart from a contact surface between the tire and the drum. The measured results are shown in Table 1.

TABLE 1

|  | Invention tire 1 | Invention tire 2 | Invention tire 3 | Conventional tire |
| --- | --- | --- | --- | --- |
| Radius of curvature of carcass line in region E at a state of inflating under an internal pressure of 1.0 kgf/cm$^2$ (mm) | R = 600 | R = 350 | R = 600 | R = 200 |
| Thickness of sidewall portion in region E (mm) | 12 | 8 | 12 | 4 |
| Minimum thickness of sidewall portion (mm) | 4 | 4 | 4 | 4 |
| Reduction level of sound pressure at 500–800 Hz(dB) | Δ1.4 | Δ1.4 | Δ1.8 | control |
| Remarks | FIG. 1 | FIG. 1 | FIG. 2 | — |

Figure 3:
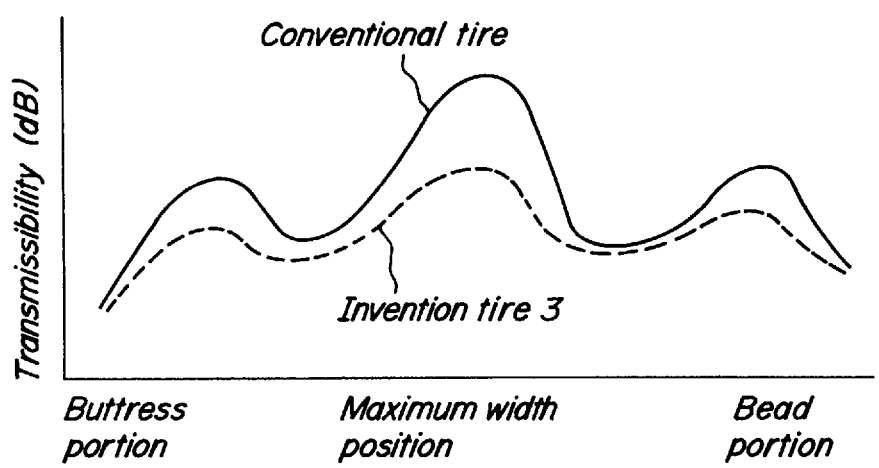
FIG. 3 is a graph showing a transmissibility in a sidewall portion of the tire.

Furthermore, each of the invention tire 3 and conventional tire is mounted onto a rim having a size of 7.5×22.5 and inflated under an internal pressure of 7.0 kgf/cm$^2$ and then placed on an indoor drum noise testing machine. Then, excitation (input) is carried out at one point of a central portion in the widthwise direction of the tread and outputs are measured by means of acceleration sensors attached to the sidewall portion at an interval of 1 cm in the radial direction of the tire to obtain results as shown in FIG. 3 in which a ratio of output to input at each position of the sensors is calculated as a transmissibility. As seen from FIG. 3, the transmissibility of the invention tire at the sidewall portion corresponding to the region E is reduced to 2.9 dB from that of the conventional tire.

What is claimed is:

1. A pneumatic radial tire comprising; a carcass toroidally extending between a pair of bead cores through a pair of sidewall portions and a belt superimposed outward about a crown portion of the carcass in a radial direction of the tire and comprised of at least two belt layers, wherein when the tire is mounted onto an approved rim and inflated under an internal pressure of 0.5–1.0 kdf/cm$^2$, in each sidewall portion a carcass line of the carcass at a radial section of the tire comprises a curve having a maximum radius of curvature in a region ranging over 10–50% of a sectional height of the tire and centering around a position of a maximum carcass width, and the sidewall portion has a maximum thickness in the above region.

2. A pneumatic radial tire according to claim 1, wherein the carcass line in the region ranging over 10–50% of the sectional height of the tire and centering around the position of maximum carcass width consists of a curve symmetrical with respect to a line segment passing through the position of maximum carcass width and parallel to a rotating axis of the tire.

3. A pneumatic radial tire according to claim 1, wherein a thickness of the sidewall portion in the region ranging over 10–50% of the sectional height of the tire and centering around the position of maximum carcass width is not less than 1.4 times a minimum thickness of the sidewall portion.

4. A pneumatic radial tire according to claim 1, wherein when said sidewall portions each have a rubber layer extending over at least 20% of said region to locate the maximum thickness of said sidewall portions in said region.

5. A pneumatic radial tire according to claim 1, wherein said carcass consists of a single ply wound around each of said bead cores from an inside of said tire to an outside and forming turnup portions.

* * * * *